US008179241B2

(12) United States Patent
Sakai et al.

(10) Patent No.: US 8,179,241 B2

(45) Date of Patent: May 15, 2012

(54) VEHICLE-USE VISUAL FIELD ASSISTANCE SYSTEM IN WHICH INFORMATION DISPATCH APPARATUS TRANSMITS IMAGES OF BLIND SPOTS TO VEHICLES

(75) Inventors: Hiroshi Sakai, Mizuho (JP); Yukimasa Tamatsu, Okazaki (JP); Ankur Datta, Pittsburgh, PA (US); Yaser Sheikh, Pittsburgh, PA (US); Takeo Kanade, Pittsburgh, PA (US)

(73) Assignees: Denso Corporation, Kariya (JP); Carnegie Mellon University, Pittsburgh, PA (US)

( * ) Notice: Subject to any disclaimer, the term of this patent is extended or adjusted under 35 U.S.C. 154(b) by 887 days.

(21) Appl. No.: 12/283,422

(22) Filed: Sep. 11, 2008

(65) Prior Publication Data

US 2009/0140881 A1 Jun. 4, 2009

(30) Foreign Application Priority Data

Sep. 14, 2007 (JP) ................................ 2007-239494

(51) Int. Cl.

*B60Q 1/00* (2006.01)
*G08G 1/16* (2006.01)
*G08G 1/123* (2006.01)
*G06K 9/00* (2006.01)

(52) U.S. Cl. ........ 340/436; 340/903; 340/988; 340/990; 340/995.2; 382/294; 344/148

(58) Field of Classification Search .................. 340/436, 340/903, 988, 990, 995.2; 382/294; 348/148

See application file for complete search history.

(56) References Cited

U.S. PATENT DOCUMENTS

| | | | | |
|---|---|---|---|---|
| 7,277,123 | B1 * | 10/2007 | Okamoto et al. | 348/148 |
| 2002/0175999 | A1 * | 11/2002 | Mutobe et al. | 348/148 |
| 2003/0108222 | A1 * | 6/2003 | Sato et al. | 382/104 |
| 2004/0105579 | A1 * | 6/2004 | Ishii et al. | 382/154 |
| 2005/0286741 | A1 * | 12/2005 | Watanabe et al. | 382/107 |
| 2006/0114363 | A1 * | 6/2006 | Kang et al. | 348/838 |
| 2007/0030212 | A1 * | 2/2007 | Shibata | 345/9 |
| 2007/0139523 | A1 * | 6/2007 | Nishida et al. | 348/148 |
| 2007/0279250 | A1 * | 12/2007 | Kume et al. | 340/903 |

(Continued)

FOREIGN PATENT DOCUMENTS

JP 2001-101566 4/2001

(Continued)

OTHER PUBLICATIONS

K. Deguchi, "Basics of Robot Vision", Jul. 12, 2000; pp. 12-31.

(Continued)

*Primary Examiner* — Brent Swarthout
*Assistant Examiner* — Andrew Bee
(74) *Attorney, Agent, or Firm* — Harness, Dickey & Pierce, PLC

(57) ABSTRACT

A camera of a ground-based information dispatch apparatus captures a blind-spot image, showing a region that is a blind spot with respect to a vehicle driver. A vehicle-mounted camera captures a forward-view image corresponding to the viewpoint of the driver, and the forward-view image is transmitted to the information dispatch apparatus together with vehicle position and direction information and camera parameters. Based on the received information, the blind-spot image is converted to a corresponding image having the viewpoint of the vehicle driver, and the forward-view image and viewpoint-converted blind-spot image are combined to form a synthesized image, which is transmitted to the vehicle.

22 Claims, 9 Drawing Sheets

U.S. PATENT DOCUMENTS

2008/0048848 A1* 2/2008 Kawakami .................... 340/435

FOREIGN PATENT DOCUMENTS

| | | | |
|---|---|---|---|
| JP | 2001101566 | * | 4/2001 |
| JP | 2003-016583 | | 1/2003 |
| JP | 2003-109199 | | 4/2003 |
| JP | 2003109199 | * | 4/2003 |
| JP | 2003-319383 | | 11/2003 |
| JP | 2004-193902 | | 7/2004 |
| JP | 2005-011252 | | 1/2005 |
| JP | 2005011252 | * | 1/2005 |
| JP | 2006-215911 | | 8/2006 |
| JP | 2007-060054 | | 3/2007 |
| JP | 2007-140674 | | 6/2007 |
| JP | 2007-164328 | | 6/2007 |

OTHER PUBLICATIONS

Office action dated Jan. 24, 2012 in corresponding Japanese Application No. 2007-239494 with English translation.

* cited by examiner

BIRD'S-EYE VIEW IMAGE

VEHICLE-USE VISUAL FIELD ASSISTANCE SYSTEM IN WHICH INFORMATION DISPATCH APPARATUS TRANSMITS IMAGES OF BLIND SPOTS TO VEHICLES

CROSS-REFERENCE TO RELATED APPLICATIONS

This application is based on and incorporates herein by reference Japanese Patent Application No. 2007-239494 filed on Sep. 14, 2007.

BACKGROUND OF THE INVENTION

1. Field of Application

The present invention relates to a vehicle-use visual field assistance system incorporating an information dispatch apparatus, for providing assistance to the driver of a vehicle by transmitting images to the vehicle showing conditions within regions (blind spots) which are blocked from the field of view of the driver by external objects such as buildings.

2. Description of Related Art

Types of vehicle-use visual field assistance system are known whereby when a vehicle (referred to in the following as the object vehicle) approaches the vicinity of a street intersection where the view ahead of the vehicle is partially obstructed by bodies external to the vehicle, such as buildings located at the right and/or left sides of the intersection, images are transmitted to the object vehicle showing the conditions at the current point in time within a region of the street intersection which is blocked from the driver's view, i.e., a region which is a blind spot with respect to that vehicle.

Such a known type of vehicle-use visual field assistance system includes a camera located near or in the street intersection which is positioned and oriented to capture images of the blind spot, and an optical beacon which is located in a position for communication with the object vehicle. The term "camera" as used herein signifies an electronic type of camera, e.g., having a CCD (charge coupled device) image sensor, from which digital data can be acquired that represent an image captured by the camera. Data expressing successive blind-spot images captured by the street intersection camera are transmitted to the object vehicle via the optical beacon, by an information dispatch apparatus. The object vehicle is equipped with a receiver apparatus for receiving the transmitted blind-spot images, and a display apparatus for displaying the blind-spot images. Such a system is described for example in Japanese patent application publication No. 2003-109199.

With such a known type of vehicle-use visual field assistance system, the images that are displayed by the display apparatus of the object vehicle, showing the conditions within the blind spot, are captured from the viewpoint of the street intersection camera.

The viewpoint of a camera or a vehicle driver is determined by a spatial position (viewpoint position, i.e., determined by ground location and elevation (with the latter being assumed to be the above-ground height, in the following description of the invention), and a viewing direction (i.e., orientation of the lens optical axis, in the case of a camera).

A problem which arises with known types of vehicle-use visual range assistance system such as that described above is that, since the viewpoint of the street intersection camera is substantially different from the viewpoint of the driver of the object vehicle, it is difficult for the driver to directly comprehend the position relationships between the object vehicle and bodies which must be avoided (other vehicles, people, etc.) and which appear in an image that has been captured by the street intersection camera.

SUMMARY OF THE INVENTION

It is an objective of the present invention to overcome the above problem, by providing a vehicle-use visual field assistance system and information dispatch apparatus which enables the driver of a vehicle to directly ascertain the current conditions within a blind spot that is located in the field of view ahead of the driver, in particular, when the vehicle is approaching a street intersection.

To achieve the above objective, the invention provides a vehicle-use visual field assistance system comprising an information dispatch apparatus and a vehicle-mounted apparatus which receives image data, etc., transmitted from the information dispatch apparatus.

The information dispatch apparatus of the system includes a camera for capturing a blind-spot image showing the current conditions within a region which is a blind spot with respect to the forward field of view of a driver of a vehicle (referred to herein as an object vehicle), when that vehicle has reached the vicinity of a street intersection and a part of the driver's forward field of view is obstructed by intervening buildings. The information dispatch apparatus also includes a vehicle information receiving apparatus (e.g., radio receiver), image generating means for generating a synthesized image to be transmitted to a vehicle, and an information transmitting apparatus (e.g., radio transmitter).

The vehicle information receiving apparatus receives vehicle information which includes a forward-view image representing the forward field of view of the driver of the object vehicle. The forward-view image may be captured by a camera that is mounted on the front end of the object vehicle, in which case the vehicle information is transmitted from the object vehicle, and includes information expressing specific parameters of the vehicle camera (focal length, etc.), together with the forward-view image.

However it would also be possible for the forward-view image to be captured by an infrastructure camera, which is triggered when a sensor detects that the object vehicle has reached a predetermined position, with the forward-view image being transmitted (by cable or wireless communication) from an infrastructure transmitting apparatus.

Basically, the image generating means performs viewpoint conversion processing of at least the blind-spot image, to obtain respective images having a common viewpoint (e.g., the viewpoint of the object vehicle driver), which are combined to form a synthesized image. This may be achieved by converting both of the blind-spot image and the forward-view image to the common viewpoint. Alternatively (for example, when the viewpoint of the object vehicle camera can be assumed to be substantially the same as that of the vehicle driver) this may be achieved by converting the blind-spot image to the viewpoint of the forward-view image, i.e., with the viewpoint of the forward-view image becoming the common viewpoint.

The synthesized image is transmitted to the object vehicle by the information transmitting apparatus of the information dispatch apparatus.

The vehicle-mounted apparatus of such a system (installed in the object vehicle) includes an information receiving apparatus to receive the synthesized image transmitted from the information dispatch apparatus, and an information display apparatus which displays the received synthesized image.

With such a system, the synthesized image to be displayed to the object vehicle driver may be formed by combining a forward-view image (having a viewpoint close to that of the vehicle driver, when the driver looks ahead through the vehicle windshield) and a converted blind-spot image which also has a viewpoint which is close to that of the vehicle driver. Hence, the driver can readily grasp the contents of the displayed synthesized image, i.e., can readily understand the position relationships between objects within the driver's field of view and specific objects (vehicles, people) that are within the blind spot.

Furthermore due to the fact that processing for performing the viewpoint conversion and for generating the synthesized image is executed by the information dispatch apparatus rather than by the vehicle-mounted apparatus, the processing load on the vehicle-mounted apparatus can be reduced.

With such a system, the image generating means (preferably implemented by a control program executed by a microcomputer) can be advantageously configured to generates the synthesized image such as to render the converted blind spot image semi-transparent, i.e., as for a watermark image on paper. That is to say, in the synthesized image, it is possible for the driver to see dangerous objects such vehicles and people within the blind spot while also seeing a representation of the actual scene ahead of the vehicle (including any building, etc, which is obstructing direct view of the blind spot). This can be achieved by multiplying picture element values by appropriate weighting coefficients, prior to combining images into a synthesized image.

Alternatively, the information dispatch apparatus preferably further comprises portion extracting means for extracting a partial blind-spot image from the converted blind-spot image, with that partial blind-spot image being converted to the common viewpoint, then combined with the forward-view image to obtain the synthesized image. The partial blind-spot image contains a fixed-size section of the blind-spot image, with that section containing any people and vehicles, etc., that are currently within the blind spot. This enables the object vehicle driver to reliably understand the positions of such people and vehicles within the blind spot, by observing the synthesized image.

Alternatively, a difference image may be extracted from the blind-spot image, i.e., an image expressing differences between a background image and the blind-spot image. The background image is an image of the blind spot which has been captured beforehand by the blind-spot image acquisition means and shows only the background of the blind spot, i.e., does not contain people, vehicles etc. The difference image is subjected to viewpoint conversion, and the resultant image is combined with the forward-view image to obtain the synthesized image.

In that case, since only a part of the contents of the blind-spot image is used in forming the synthesized image, the amount of processing required to generate the synthesized image can be reduced.

The partial blind-spot image or difference image may be subjected to various types of processing such as edge-enhancement, color alteration or enhancement, etc., when generating the synthesized image. In that way, the object vehicle driver can readily grasp the position relationships between the current position of the object vehicle and the conditions within the blind spot, from the displayed synthesized image.

From another aspect, the blind-spot image and the received forward-view image can each be converted by the information dispatch apparatus to a common birds-eye viewpoint, with the synthesized image representing an overhead view which includes the blind spot and also includes a region containing the current position of the object vehicle, with that current position being indicated in the synthesized image, e.g., by a specific marker. The positions of objects such as people and vehicles that are currently within the blind spot are also preferably indicated by respective markers in the synthesized image.

By providing a birds-eye view as the synthesized image, enabling the object vehicle driver to visualize the conditions within the street intersection as viewed from above, the driver can directly grasp the position relationships (distances and directions) between the object vehicle and dangerous bodies such as vehicles and people that are within the blind spot.

It would be also possible to configure such a system such that blind-spot images may be acquired from various vehicles other than the object vehicle, i.e., with each of these other vehicles being equipped with a camera and transmitting means. In that case, the blind-spot image acquisition means can acquire a blind-spot image when it is transmitted from one of these other vehicles as that vehicle is travelling toward the blind spot.

From another aspect, a field of view assistance system according to the present invention preferably includes display inhibiting means, for inhibiting display of the synthesized image by the display means of the vehicle-mounted apparatus when the object vehicle becomes located within a predetermined distance from a street intersection, i.e., is about to enter the street intersection. The information dispatch apparatus can judge the location of the object vehicle based on contents of vehicle information that is transmitted from the object vehicle. By halting the image display when the object vehicle it about to enter the street intersection, there is decreased danger that the vehicle driver will be observing the display at a time when the driver should be directly viewing the scene ahead of the vehicle.

Furthermore in that case, the information dispatch means of the information dispatch apparatus is preferably configured to transmit a warning image to the object vehicle, instead of a synthesized image, when the display inhibit means inhibits generation of the synthesized image. When this warning image is displayed to the object vehicle driver, the driver will be induced to proceed into the street intersection with caution, directly observing the forward view from the vehicle. Safety can thereby be enhanced.

The information dispatch apparatus and vehicle-mounted apparatus of a vehicle-use visual range assistance system according to the present invention are preferably configured for radio communication as follows. The vehicle-mounted apparatus is provided with a vehicle-side radio transmitting and receiving apparatus, and uses that apparatus to transmit a predetermined verification signal. The information dispatch apparatus is provided with a dispatch-side radio transmitting and receiving apparatus, and when that apparatus receives the verification signal from the object vehicle, the information dispatch apparatus transmits a response signal. When the response signal is received, the vehicle-mounted apparatus transmits the vehicle information via the vehicle-side radio transmitting and receiving apparatus.

In that way, since the vehicle-mounted apparatus transmits the vehicle information only after it has confirmed that the object vehicle is located at a position in which it can communicate with the information dispatch apparatus, the amount of control processing that must be performed by the vehicle-mounted apparatus can be minimized.

BRIEF DESCRIPTION OF THE DRAWINGS

FIG. 7A is an example of a forward-view image that is captured by a vehicle-mounted camera, while

DESCRIPTION OF PREFERRED EMBODIMENTS

Configuration of Vehicle-Use Visual Field Assistance System

Figure 1:
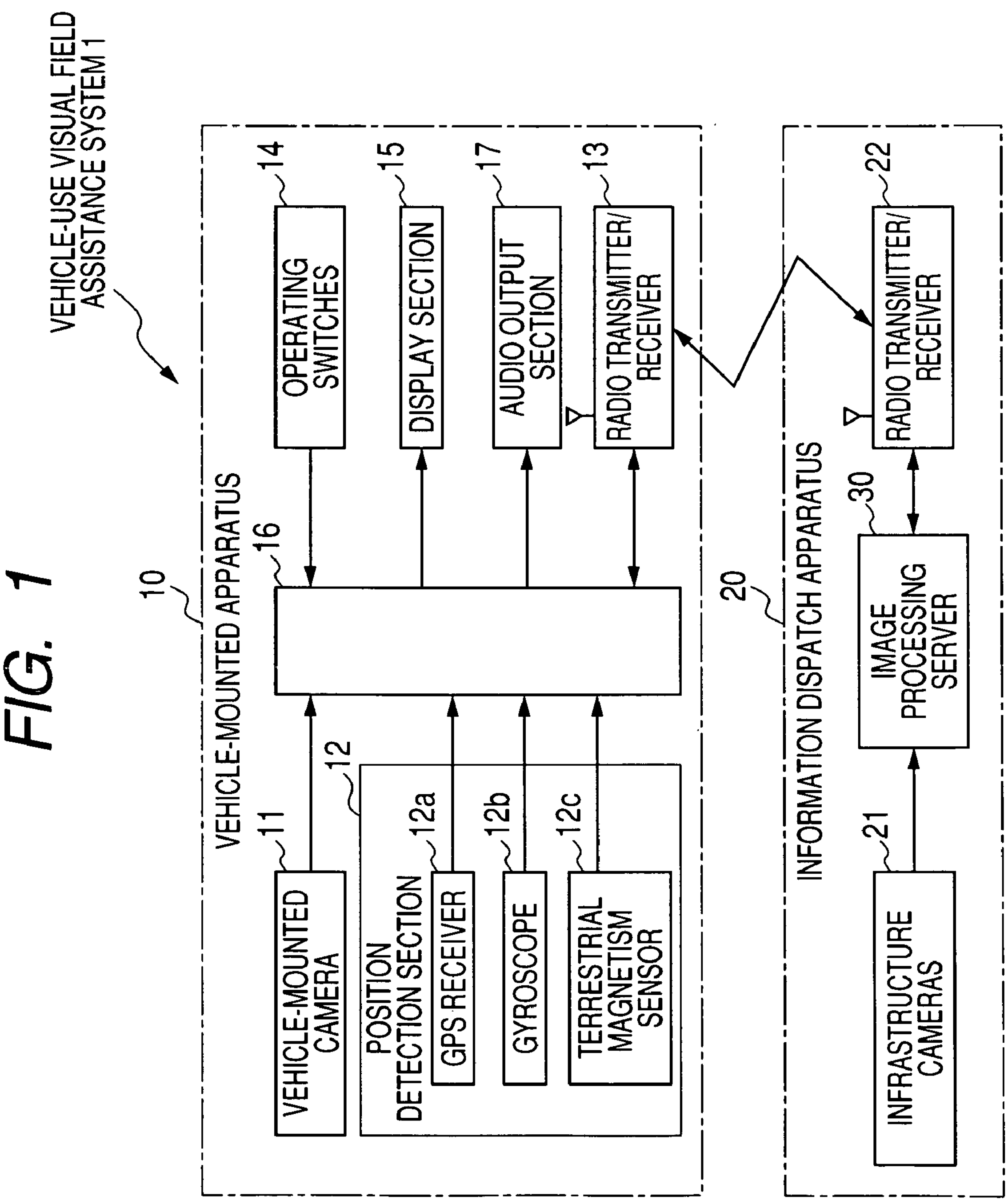
FIG. 1 is a block diagram showing the overall configuration of an embodiment of a vehicle-use visual field assistance system.

FIG. 1 is a block diagram showing the general configuration of an embodiment of a vehicle-use visual field assistance system. As shown, the system includes an information dispatch apparatus 20 which is installed near a street intersection, for communicating with a vehicle which has moved close to the intersection (i.e., is preparing to move through that intersection), to provide assistance to the driver of that vehicle (referred to in the following as the object vehicle). The system further includes a vehicle-mounted apparatus 10 which is installed in the object vehicle.

Configuration of Vehicle-Installed Apparatus

The vehicle-mounted apparatus 10 includes a vehicle camera 11 which is mounted at the front end of the vehicle (e.g., on a front fender), and is arranged such as to capture images having a field of view that is close to the field of view of the vehicle driver when looking straight ahead. The vehicle-mounted apparatus 10 further includes a position detection section 12, a radio transmitter/receiver 13, operating switches 14, a display section 15, a control section 16 and an audio output section 17. The position detection section 12 serves to detect the current location of the vehicle and the direction along which the vehicle is currently travelling. The radio transmitter/receiver 13 serves for communication with devices external to the vehicle, using radio signals. The operating switches 14 is used by the vehicle driver to input various commands and information, and the display section 15 displays images, etc. The audio output section 17 serves for audibly outputting various types of guidance information, etc. The control section 16 executes various types of processing in accordance with inputs from the vehicle camera 11, the position detection section 12, the radio transmitter/receiver 13 and the operating switches 14, and controls the radio transmitter/receiver 13, the display section 15 and the audio output section 17.

The position detection section 12 includes a GPS (global positioning system) receiver 12*a*, a gyroscope 12*b* and an earth magnetism sensor 12*c*. The GPS receiver 12*a* receives signals from a GPS antenna (not shown in the drawings) which receives radio waves transmitted from GPS satellites. The gyroscope 12*b* detects a magnitude of turning motion of the vehicle, and the earth magnetism sensor 12*c* detects the direction along which the vehicle is currently travelling, based on the magnetic field of the earth.

The display section 15 is a color display apparatus, and can be utilize any of various known types of display devices such as a semitransparent type of LCD (liquid crystal display), a rear-illumination type of LCD, an organic EL (electroluminescent) display, a CRT (cathode ray tube), a HUD (heads-up display), etc. The display section 15 is located in the vehicle interior at a position where the display contents can be readily seen by the driver. For example if a semitransparent type of LCD is used, this can be disposed on the front windshield, a side windshield, a side mirror or a rear-view mirror. The display section 15 may be dedicated for use with the vehicle-use visual field assistance system 1, or the display device of some other currently installed apparatus (such as a vehicle navigation apparatus) may be used in common for that other apparatus and also for the vehicle-use visual field assistance system 1.

The control section 16 is a usual type of microcomputer, which includes a CPU (central processing unit), ROM (read-only memory), RAM (random access memory), I/O (input/output) section, and a bus which interconnects these elements. Regions are reserved in the ROM for storing characteristic information that is specific to the camera 11, including internal parameters SP1 and external parameters (relative information) SI of the camera 11. The internal parameters SP1 express characteristics of the vehicle camera 11 such as the focal length of the camera lens, etc., as described in detail hereinafter. The relative information SI may include the orientation direction of the vehicle camera 1 in relation to the direction of forward motion of the vehicle, and the height of the camera in relation to an average value of height of a vehicle driver's eyes.

The control section 16 executes a vehicle-side control processing routine as described in the following, in accordance with a program that is held stored in the ROM.

Figure 2:
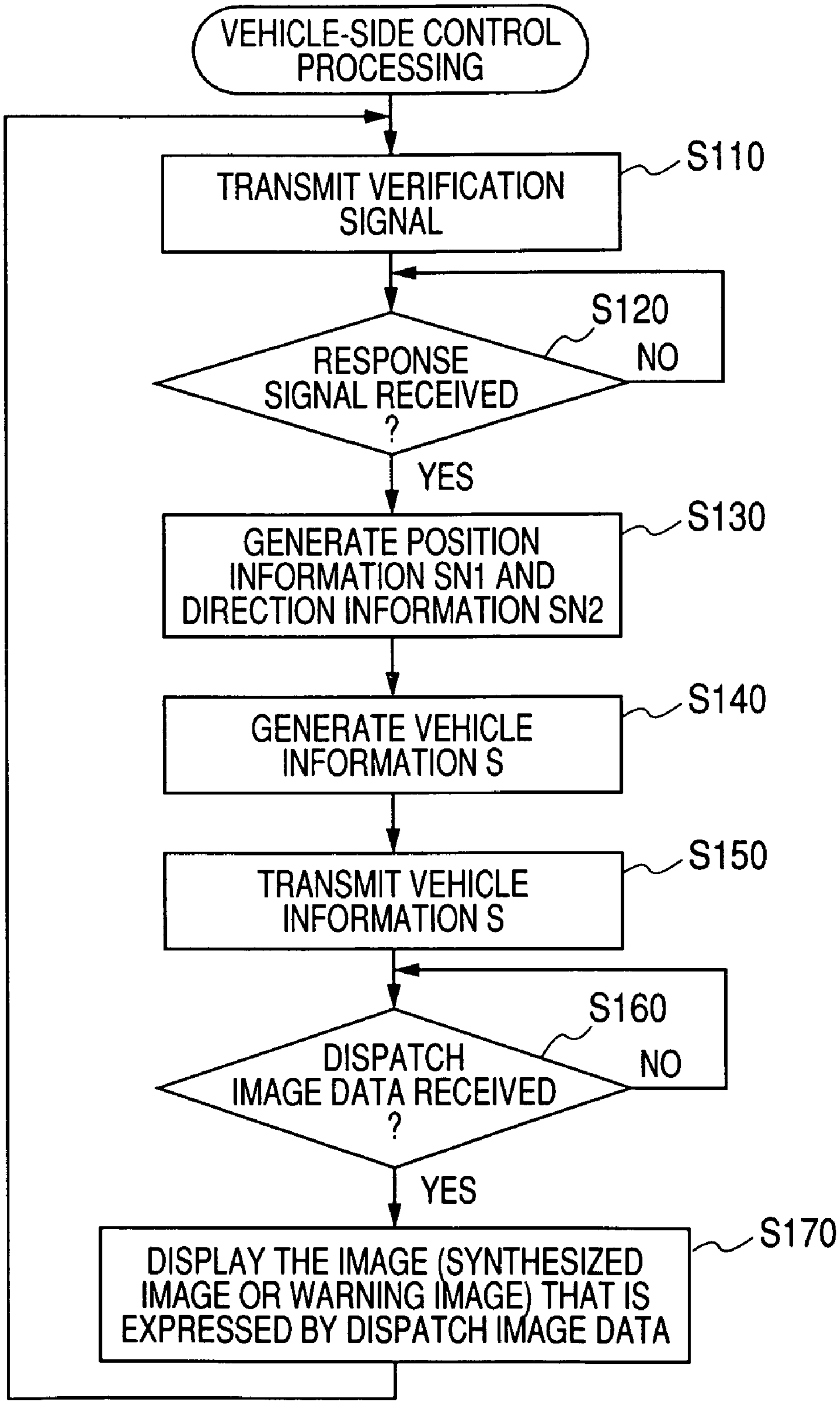
FIG. 2 is a flow diagram of vehicle-side control processing that is executed by a control section of a vehicle-installed apparatus of the system.

FIG. 2 is a flow diagram of this vehicle-side control processing routine. The processing is started in response to an activation command from the vehicle driver, generated by actuating one of the operating switches 14.

Firstly in step S110, to determine whether the vehicle is in a location where communication with the information dispatch apparatus 20 is possible, a verification signal is transmitted via the radio transmitter/receiver 13. The verification signal conveys an identification code SD1 which has been predetermined for the object vehicle.

Next in step S120, a decision is made as to whether a response signal has been received via the radio transmitter/receiver 13, i.e., a response signal that conveys an identification code SD2 and so constitutes a response to the verification signal that was transmitted in step S110. If there is a YES decision then step S130 is executed, while otherwise, operation waits until a response signal conveying the identification code SD2 is received.

In step S130, position information SN1 which expresses the current location of the object vehicle and direction information SN2 which expresses the direction in which the vehicle is travelling are generated, based on detection results obtained from the position detection section 12.

Figure 7A:
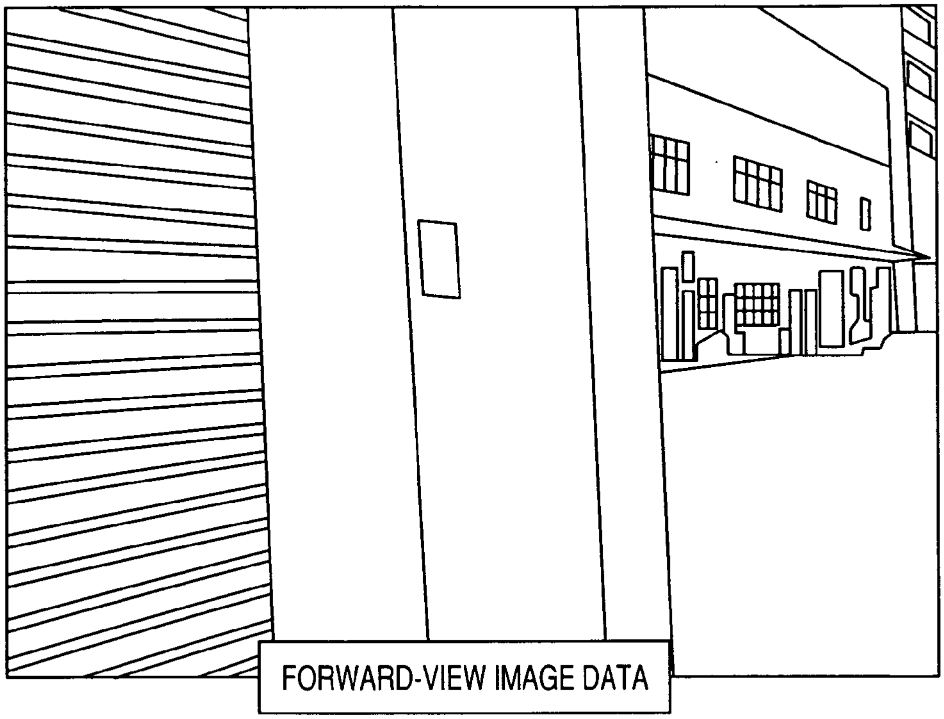

Next in step S140, vehicle information S is generated, which includes the position information SN1 and direction information SN2 obtained in step S130, forward-view image data (expressing a real-time image currently captured by the vehicle camera 11, for example of the form shown in FIG. 7A), and also includes the above-described internal parameters SP1 of the vehicle camera 11 and relative position information (i.e., external parameters of the vehicle camera 11) SI, which are read out from the ROM of the control section 16.

Next in step S150, the vehicle information S obtained in step S140 is transmitted via the radio transmitter/receiver 13 together with an identification code SD3, which serves to indicate that this is a transmission in reply to a response signal.

Next in step S160, a decision is made as to whether dispatch image data (described hereinafter) transmitted from the information dispatch apparatus 20 has been received via the radio transmitter/receiver 13 together with an identification code SD4. The identification code SD4 indicates that these received data have been transmitted by the information dispatch apparatus 20 in reply to the vehicle information S transmitted in step S150. If there is a YES decision in step S160 then step S170 is executed, while otherwise, operation waits until the dispatch image data are received.

In step S170, the image (a synthesized image, as described hereinafter) conveyed by the dispatch image data received in step S160 is displayed by the display section 15. Operation then returns to step S110.

Configuration of Information Dispatch Apparatus 20

As shown in FIG. 1, the information dispatch apparatus 20 includes a set of infrastructure cameras 21, a radio transmitter/receiver 22 and an image processing server 30. Successive images of blind spots of the street intersection are acquired from the infrastructure cameras 21. The radio transmitter/receiver 22 is configured for communication with vehicles by radio signals. The image processing server 30 executes various types of processing, as well as generating synthesized images which are transmitted to the object vehicle. Each synthesized image is generated based on information that is inputted from the radio transmitter/receiver 22 and on a blind-spot image acquired from an appropriate one of the cameras of the infrastructure cameras 21.

Figure 3:
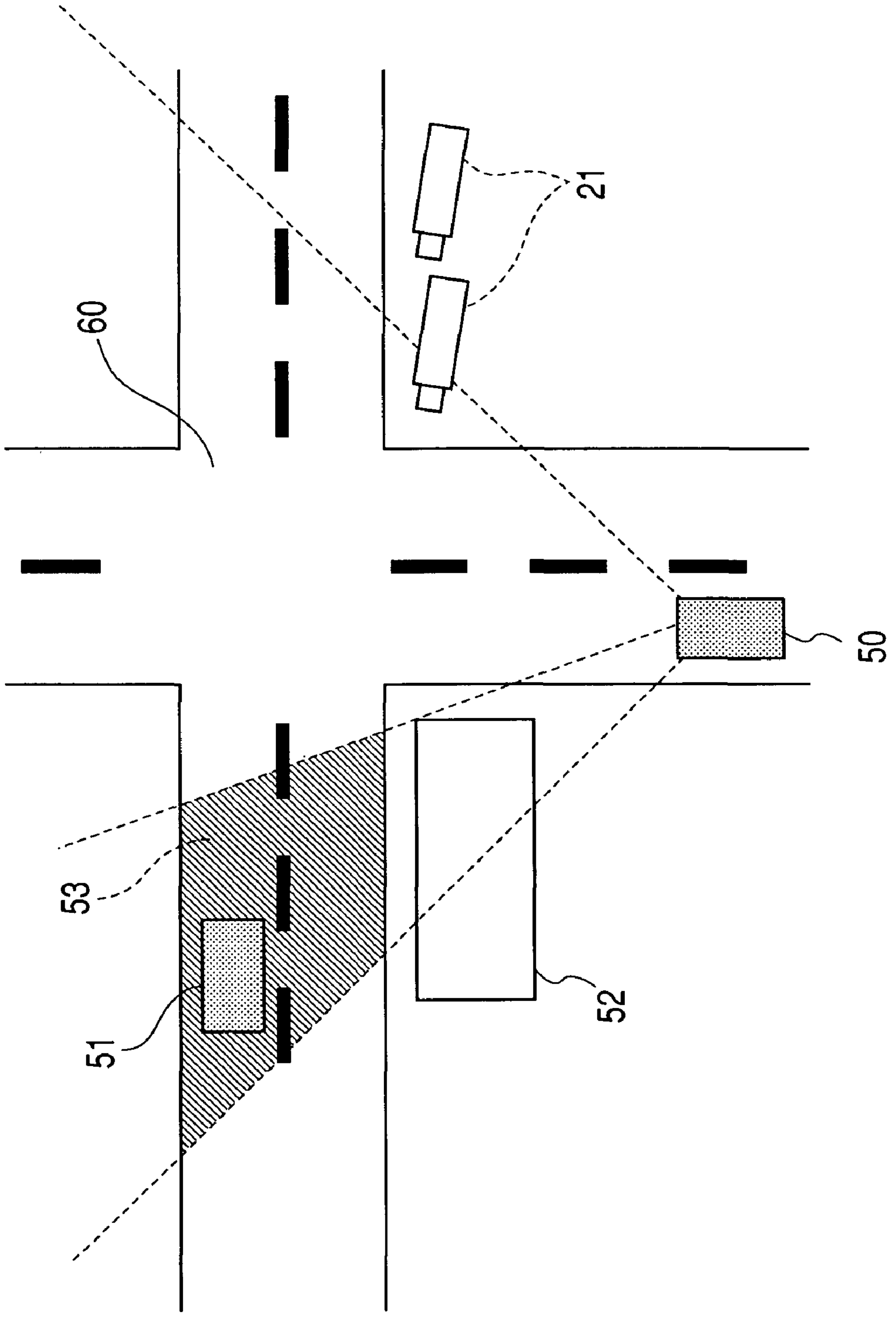
FIG. 3 is a diagram for describing a blind-spot image that is captured by an infrastructure-side camera group in an information dispatch apparatus of the embodiment.

With this embodiment as illustrated in FIG. 3, infrastructure cameras 21 are oriented to capture images of respectively different blind spots the street intersection. Each blind spot is a regions which is blocked (by a building, etc.) from the field of view of the driver of a vehicle, such as the blind spot 53 of the vehicle 50 in FIG. 3, which is approaching the street intersection 60 from a specific direction, so that bodies such as the vehicle 51 within the blind spot 53 are hidden from the driver of the vehicle 50 by a building 52. For simplicity of description, the embodiment will be described only with respect to images of one specific blind spot, which are successively are captured by one camera of the infrastructure cameras 21, and with synthesized images being transmitted to a single object vehicle. However it will be understood that the infrastructure cameras 21 are continuously acquiring successive images covering a plurality of different blind spots.

The blind-spot images which are captured in real time by each of the infrastructure cameras 21 are successively supplied to the image processing server 30 of the information dispatch apparatus 20.

The infrastructure cameras 21 can be coupled to the image processing server 30 by communication cables such as optical fiber cables, etc., or could be configured to communicate with the image processing server 30 via a wireless link, using directional communication.

Configuration of Image Processing Server 30

Figure 4:
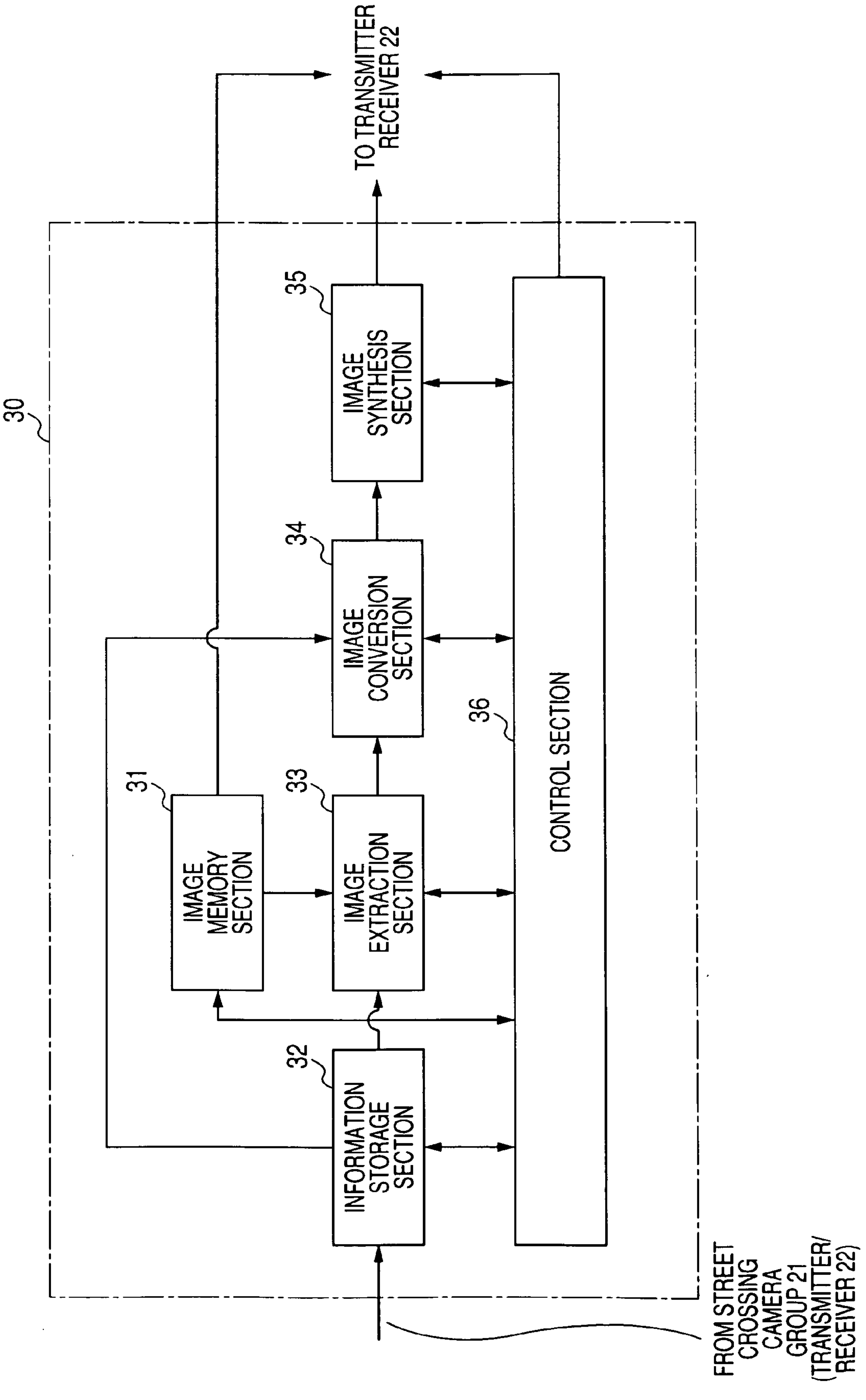
FIG. 4 is a block diagram of an image processing server in the information dispatch apparatus.

FIG. 4 is a block diagram showing the configuration of the image processing server 30 in the information dispatch apparatus 20 of this embodiment. The image processing server 30 is an electronic control apparatus, based on a microcomputer, which processes image data etc. As shown in FIG. 4, the image processing server 30 is made up of an image memory section 31, an information storage section 32, an image extraction section 33, an image conversion section 34, an image synthesis section 35 and a control section 36.

The image memory section 31 has background image data stored therein, expressing background images of each of the aforementioned blind spots, which have been captured previously by the infrastructure cameras 21. Each background image shows only the fixed background of the blind spot, i.e., only buildings and streets, etc., without objects such as vehicles or people appearing in the image.

The information storage section 32 temporarily stores blind-spot image data that are received from the infrastructure cameras 21, vehicle information S, and the contents of various signals that are received via the radio transmitter/receiver 22.

The image extraction section 33 extracts data expressing a partial blind-spot image from the blind-spot image data currently held in the information storage section 32. Each partial blind-spot image contains a section (of fixedly predetermined size) extracted from a blind-spot image, with that section being positioned such as to include any target objects (vehicles, people, etc.) appearing in the blind-spot image. All picture elements of the partial blind-spot image which are outside the extracted section are reset to a value of zero, and so do not affect a synthesized image (generated as described hereinafter).

The image conversion section 34 operates based on the vehicle information S that is received via the radio transmitter/receiver 22, to perform viewpoint conversion of the partial blind-spot image data that are extracted by the image extraction section 33, to obtain data expressing a viewpoint-converted partial blind spot image. With this embodiment it is assumed that the viewpoint of the vehicle camera 11 is close to that of the object vehicle driver, and the viewpoint of the partial blind-spot image is converted to that of the vehicle camera 11, i.e., to be made substantially close to that of the object vehicle driver.

The image synthesis section 35 uses the viewpoint-converted partial blind spot image data generated by the image conversion section 34 to produce the synthesized image as described in the following.

The control section 36 controls each of the above-described sections 31 to 35.

In addition to storing the background image data, the image memory section 31 also stores warning image data, for use in providing visual warnings to the driver of the object vehicle.

The control section 36 is implemented as a usual type of microcomputer, based on a CPU, ROM, RAM, I/O section, and a bus which interconnects these elements. Respective sets of characteristic information, specific to each of the cameras of the camera group 21, are stored beforehand in the ROM of the control section 36. Specifically, internal parameters (as defined hereinafter) of each of the infrastructure cameras 21, designated as CP1, are stored in a region of the ROM. External parameters CP2 which consist of position information CN1 expressing the respective positions (ground positions and above-ground heights) of the infrastructure cameras 21 and direction information CN2, expressing the respective directions in which these cameras are oriented, are also stored in a region of the ROM of the control section 36.

The control section 36 executes an infrastructure-side control processing routine (described hereinafter), based on a program that is stored in the ROM.

The image conversion section 34 performs viewpoint conversion by a method employing known camera parameters, as described in the following.

When an electronic camera captures an image, the image is acquired as data, i.e., as digital values which, for example express respective luminance values of an array of picture elements. Positions within the image represented by the data are measured in units of picture elements, and can be expressed by a 2-dimensional coordinate system M having coordinate axes (u, v). Each picture element corresponds to a rectangular area of the original image (that is, the image that is formed on the image sensor of the camera). The dimensions of that area (referred to in the following as the picture element dimensions) are determined by the image sensor size and number of image sensor cells, etc.

A 3-dimensional (x, y, z) coordinate system X for representing positions in real space can be defined with respect to the camera (i.e., with the z-axis oriented along the lens optical axis and the x-y plane parallel to the image plane of the camera). The respective inverses of the u-axis and v-axis picture element dimensions will be designated as $k_u$ and $k_v$ (used as scale factors), the position of intersection between the optical axis and the image plane (i.e., position of the image center) as (u0, v0), and the lens focal length as f.

In that case, assuming that the angle between the (u, v) axes corresponds to a spatial (i.e., real space) angle of 90°, the position (x,y,z) of a point defined in the X coordinate system (i.e., a point within a 3-dimensional scene that has been captured as a 2-dimensional image) corresponds to a u-axis position of $\{f.k_u.(x/z)+u_0\}$ and to a v-axis position of $\{f.k_v.(y/z)+v_0\}$.

In some types of camera such as a camera having a CCD image sensor, the angle between the u and v axes may not exactly correspond to a spatial angle of 90°. In the following, $\phi$ denotes the effective spatial angle between the u and v axes. f, $(u_0, v_0)$, $k_u$ and $k_v$, and $\phi$ are referred to as the internal parameters of a camera.

As shown by equation (1) below, a matrix A can be formed from the internal parameters.

$$A = \begin{bmatrix} fk_u & fk_u\cot\phi & u_0 \\ 0 & fk_v/\sin\phi & v_0 \\ 0 & 0 & 1 \end{bmatrix} \text{ where } M = \begin{bmatrix} u \\ v \\ 1 \end{bmatrix} \quad (1)$$

If the exact value of $\phi$ is not available, cot $\phi$ and sin $\phi$ can be respectively fixed as 0 and 1.

Using the internal parameter matrix A, the following equation (2) below can be used to transform between the camera coordinates X and the 2-dimensional coordinate system M of the image.

$$M = AX \text{ where } X = \begin{bmatrix} x/z \\ y/z \\ 1 \end{bmatrix} \quad (2)$$

By using equation (2), a position in real space, defined with respect to the camera coordinates X, can be transformed to the position of a corresponding picture element of an image, defined with respect to the 2-dimensional image coordinates M.

Such equations are described for example in the publication "Basics of Robot Vision" pp 12~24, published in Japan by Corona Co.

Furthermore by using the relationships expressed by the following equations (3), an image which is captured by a first one of two cameras (with that image expressed by the 2-dimensional coordinates M1 in equations (3)) can be converted into a corresponding image which has (i.e., appears to have been captured from) the viewpoint of the second one of the cameras and which is expressed by the 2-dimensional coordinates M2. This is achieved based on respective internal parameter matrixes A1 and A2 for the two cameras. Equations (3) are described for example in the aforementioned publication "Basics of Robot Vision", pp 27~31.

$$(M_2)^T F(M_1) = 0, \quad (3)$$

$$\text{但し、} F = (A_2^{-1})^T TR(A_1^{-1}),$$

$$T = \begin{bmatrix} 0 & -t_3 & t_2 \\ t_3 & 0 & -t_1 \\ -t_2 & t_1 & 0 \end{bmatrix},$$

$$\begin{bmatrix} t_1 \\ t_2 \\ t_3 \end{bmatrix} = R_2(T_1 - T_2),$$

$$R = R_2(R_1)^{-1}$$

In the above, R1 is a rotational matrix which expresses the relationship between the orientation of an image from the first camera (i.e., the orientation of the camera coordinate system) and a reference real-space coordinate system (the "world coordinates"). R2 is the corresponding rotational matrix for the second camera. T1 is a translation matrix, which expresses the position relationship between an image from the first camera (i.e., origin of the camera coordinate system) and the origin of the world coordinates, and T2 is the corresponding translation matrix for the second camera. F is known as the fundamental matrix.

By acquiring each camera orientation direction and spatial position, R1, R2 and (T1-T2) can be readily derived. These can be used in conjunction with the respective internal parameters of the cameras to calculate the fundamental matrix F above. Hence by using equations (3), considering a picture element at position m1 in an image (expressed by M1) from the first camera, the value of that picture element can be correctly assigned to an appropriate corresponding picture element at position m2, in a viewpoint-converted image (expressed by M2) which has the viewpoint of the second camera.

Thus, by using the respective spatial positions (ground position and above-ground height) and orientations of the camera 11 of an object vehicle and of a camera in the camera group 21, and the internal parameters of the two cameras, processing based on the above equations can be applied to transform a blind-spot image to a corresponding image as it would appear from the viewpoint of the driver of the object vehicle.

Infrastructure-Side Control Processing

The processing executed by the information dispatch apparatus 20 will be referred to as the infrastructure-side control processing, and is described in the following referring to the flow diagram of FIG. 5. Firstly in step S210 a decision is made as to whether a verification signal has been received from the vehicle-mounted apparatus 10 via the radio transmitter/receiver 22. If there is a YES decision then step S215 is executed, while otherwise, operation waits until a verification signal is received.

In step S215, an identification code SD2 is generated, to indicate a response to the identification code SD1 conveyed by the verification signal received in step S210. A response signal conveying the identification code SD2 is then transmitted via the radio transmitter/receiver 22.

Next in step S220 a decision is made as to whether the vehicle information S and an identification code SD3 have been received from the vehicle-mounted apparatus 10 via the radio transmitter/receiver 22. If there is a YES decision then step S225 is executed, while otherwise, operation waits until a verification signal is received. The received vehicle information S is stored in the information storage section 32 together with the blind-spot image data that have been received from the infrastructure cameras 21.

In step S225 a decision is made as to whether the object vehicle is positioned within a predetermined distance from the street intersection, based upon the position information SN1 contained in the vehicle information S that was received in step S220. If there is a YES decision then step S230 is executed, while otherwise, operation proceeds to step S235.

In step S230, warning image data which have been stored beforehand in the image memory section 31 are established as the dispatch image data that are to be transmitted to the object vehicle. Step S275 is then executed.

However if step S235 is executed, then image difference data which express the differences between the background image data held in the image memory section 31 and the blind-spot image data held in the information storage section 32 are extracted, and supplied to the image extraction section 33. That is to say, the image difference data express a difference image in which all picture elements representing the background image are reset to a value of zero (and so will have no effect upon the synthesized image). Hence only image elements other than those of the background image (if any) will appear in the difference image.

Next in step S240, a decision is made as to whether any target objects such as vehicles and/or people, etc., (i.e., bodies which the object vehicle must avoid) appear in the image expressed by the image difference data. If there is a YES decision then step S245 is executed, while otherwise, operation proceeds to step S250.

In step S245 a fixed-size section of the blind-spot image is selected, with that section being positioned within the blind-spot image such as to contain the vehicles and/or people, etc., that were detected in step S240. The values of all picture elements of the blind-spot image other than those of the selected section are reset to zero (so that these will have no effect upon a final synthesized image), to thereby obtain data expressing the partial blind-spot image.

However if it is judged in step S240 that there are no target objects in the image expressed by the partial blind-spot image data, so that operation proceeds to step S250, then the aforementioned fixed-size selected section of the blind-spot image is positioned to contain the center of the blind-spot image, and the data of the partial blind-spot image are then generated as described above for step S245.

In that way, the image extraction section 33 extracts partial blind-spot image data based on the background image data that are held in the image memory section 31 and on the blind-spot image data held in the information storage section 32.

Following step S245 or S250, in step S260, the image conversion section 34 performs viewpoint conversion processing for converting the viewpoint of the image expressed by the partial blind-spot image data obtained by the image extraction section 33 to the viewpoint of the vehicle camera 11 which captured the forward-view image. The viewpoint conversion is performed using the internal parameters CP1 and external parameters CP2 of the infrastructure cameras 21 (that is, of the specific camera which captured this blind-spot image) held in the ROM of the control section 36, and on the internal parameters SP1, position information SN1, direction information SN2 and relative information SI which are contained in the vehicle information S that was received in step S220.

Specifically, the detected position of the object vehicle is set as the ground position of the object vehicle camera 11, the height of the camera 11 is obtained from the relative height that is specified in the relative information SI, and the orientation direction of the camera 11 is calculated based on the direction information SN2 in conjunction with the direction relationship that is specified in the relative information SI.

Figure 7B:
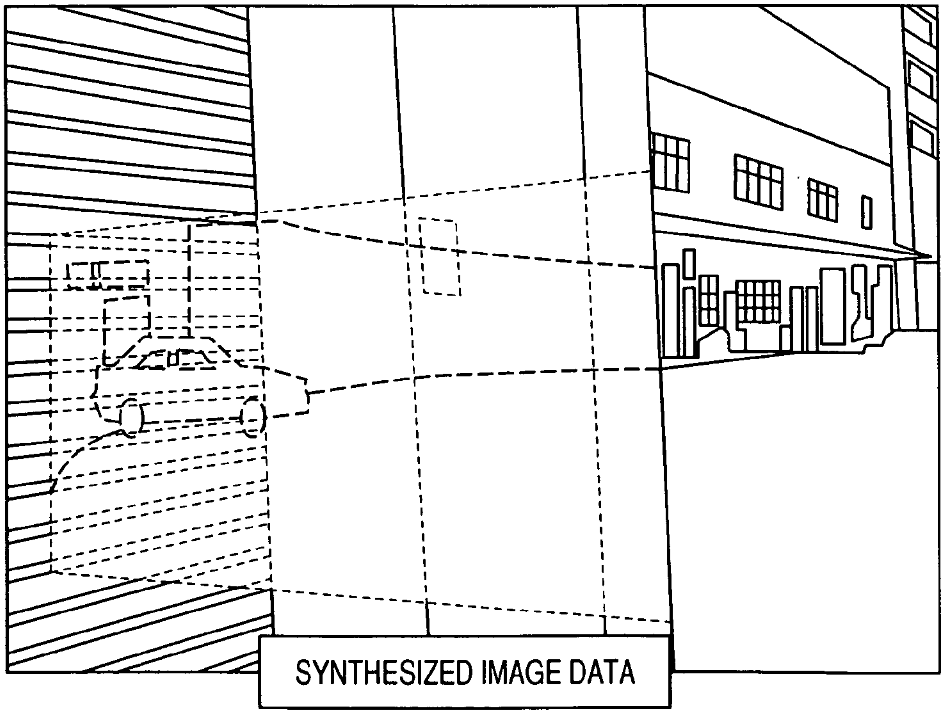
FIG. 7B shows a corresponding synthesized image that is generated by the information dispatch apparatus of the embodiment based on the forward-view image.

Next in step S265, the viewpoint-converted partial blind-spot image data derived by the image conversion section 34 and the forward-view image data that have been stored in the information storage section 32 are combined by the image synthesis section 35 to generate a synthesized image. With this embodiment, the synthesizing processing is performed by applying weighting to specific picture element values such that the viewpoint-converted partial blind-spot image becomes semi-transparent, as it appears in the synthesized image (i.e., has a "watermark" appearance, as indicated by the broken-line outline portion in FIG. 7B).

Specifically, in combining the viewpoint-converted partial blind-spot data with the forward-view image data, designating $\alpha$ as the value (e.g., luminance value) of a picture element in the viewpoint-converted partial blind-spot image, $\alpha$ is multiplied by a weighting value designated as the transmission coefficient $T\alpha$ (where $0<T\alpha<1$) while the value of the correspondingly positioned picture element in the forward-view image is multiplied by a weighting value designated as the transmission coefficient $T\beta$ (where $T\beta=1-T\alpha$), and the results of the two products are summed to obtain the value $\gamma$ of a picture element of the synthesized image.

Processing other than (or in addition to) weighted summing of picture element values could be applied to obtain synthesized image data. For example, image expansion or compression, edge-enhancement, color conversion (e.g., YUV→RGB), color (saturation) enhancement or reduction, etc., could be applied to one or both of the images that are to be combined to produce the synthesized image.

Next, in S270, synthesized image data that have been generated by the image synthesis section 35 are set as the dispatch image data.

In step S275 the synthesized image data that have been set as the dispatch image data in step S230 or step S270 are transmitted to the object vehicle via the radio transmitter/receiver 22, together with the identification code SD4 which indicates that this is a response to the vehicle information S that was transmitted from the object vehicle.

Operation

Figure 6:
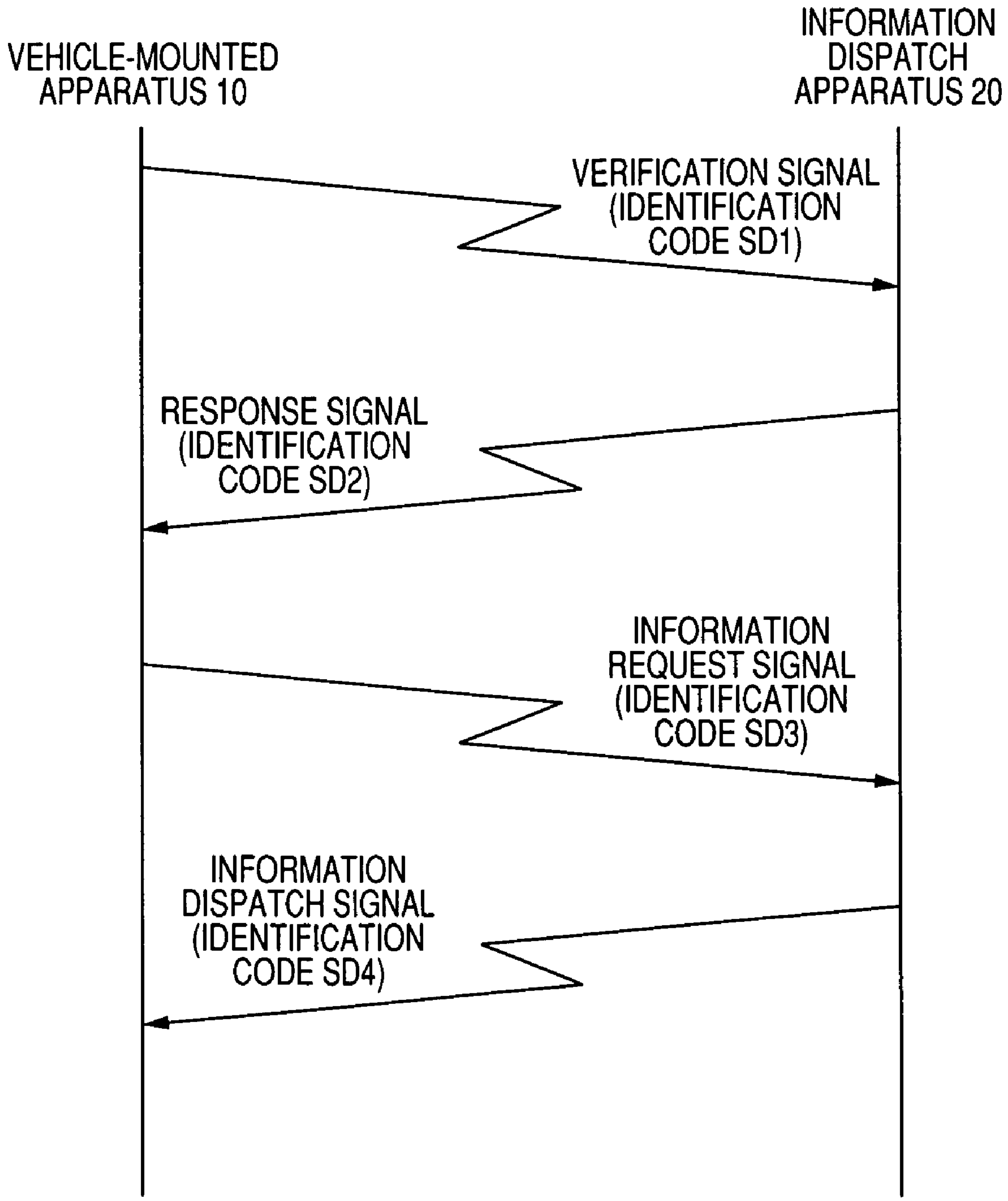
FIG. 6 is a sequence diagram for illustrating the operation of the embodiment.

The operation of the vehicle-use visual field assistance system 1 will be described in the following referring to the sequence diagram of FIG. 6. Firstly, when the driver of the vehicle-mounted apparatus 10 activates the vehicle-side control processing, periodic transmission of a verification signal is started. This verification signal conveys the identification code SD1, to indicate that this signal has been transmitted from an object vehicle through vehicle-side control processing.

When the information dispatch apparatus 20 receives this verification signal, it transmits a response signal, which conveys the identification code SD1 that was received in the verification signal from the vehicle-mounted apparatus 10, together with the identification code SD2, and with a supplemental code A1 attached to the identification code SD2, for indicating that this transmission is in reply to the verification signal from the vehicle-mounted apparatus 10.

When the vehicle-mounted apparatus 10 receives this response signal, it transmits an information request signal. This signal conveys the identification code SD2 from the received response signal, together with the vehicle information S, the identification code SD3, and a supplemental code A2 attached to the identification code SD2, for indicating that this transmission is in reply to the response signal from the information dispatch apparatus 20.

When the information dispatch apparatus 20 receives this information request signal, it transmits an information dispatch signal. This conveys the dispatch image data and the identification code SD4, with a supplemental code A3 attached to the identification code SD4 for indicating that this transmission is in reply to the vehicle information S.

In that way, with this embodiment, the vehicle-mounted apparatus 10 checks whether it is currently within a region in which it can communicate with the information dispatch apparatus 20, based on the identification codes SD1 and SD2. If communication is possible, the information dispatch apparatus 20 transmits the dispatch image data to the object vehicle vehicle-mounted apparatus 10 based on the identification codes SD3 and SD4, i.e., with the dispatch image data being transmitted to the specific vehicle from which vehicle information S has been received.

EFFECTS OF EMBODIMENT

With the embodiment described above, the information dispatch apparatus 20 converts blind-spot image data (captured by the infrastructure cameras 21) into data expressing a blind-spot image having the same viewpoint as that of the forward-view image data (captured by the vehicle camera 11), and hence having substantially the same viewpoint as that of the object vehicle driver. The viewpoint-converted blind-spot image data are then combined with the forward-view image data, to generate data expressing a synthesized image, and the synthesized image data are then transmitted to the vehicle-mounted apparatus 10.

Hence, since the synthesized image data generated by the information dispatch apparatus 20 express an image as seen from the viewpoint of the driver of the object vehicle, or substantially close to that viewpoint, the embodiment enables data expressing an image that can be readily understood by the vehicle driver to be directly transmitted to the object vehicle.

In addition with the above embodiment, instead of combining an entire viewpoint-converted blind-spot image with a forward-view image to obtain a synthesized image, an image showing only a selected section of the blind-spot image, with that section containing vehicles, people, etc., may be combined with the forward-view image to obtain the synthesized image, thereby reducing the amount of image processing required.

Furthermore with the above embodiment, the information dispatch apparatus 20 performs all necessary processing for viewpoint conversion and synthesizing of image data. Hence since it becomes unnecessary for the vehicle-mounted apparatus of the vehicle-mounted apparatus 10 to perform such processing, the processing load on the apparatus of the vehicle-mounted apparatus 10 is reduced.

Moreover the information dispatch apparatus 20 performs the viewpoint conversion and combining of image data based on the internal parameters CP1, SP1 of the infrastructure cameras 21 and the vehicle camera 11, the external parameters CP2 of the infrastructure cameras 21, and on the camera internal parameters, position information SN1 and direction information SN2 that are transmitted from the object vehicle. Hence, viewpoint conversion and synthesizing of image data that are sent as dispatch image data to the object vehicle can be accurately performed.

Furthermore, if the information dispatch apparatus 20 finds (based on the position information SN1 transmitted from the object vehicle) that the object vehicle is located within a predetermined distance from the street intersection, then instead of transmitting a synthesized image data to the object vehicle, the information dispatch apparatus 20 can be configured to transmit warning image data, for producing a warning image display in the object vehicle. The driver of the object vehicle is thereby prompted (by the warning image) to enter the street intersection with caution, directly observing the forward view from the vehicle rather than observing a displayed image. Safety can thereby be enhanced.

OTHER EMBODIMENTS

Although the invention has been described hereinabove with respect to a first embodiment, it should be noted that the scope of the invention is not limited to that embodiment, and that various alternative embodiments can be envisaged which fall within that scope, for example as described in the following. Since it will be apparent that each of the following alternative embodiments can be readily implemented based on the principles of the first embodiment described above, detailed description is omitted.

Alternative Embodiment 1

With the first embodiment described above, the position information SN1 and direction information SN2 of the camera installed on the object vehicle are used as a basis for converting the viewpoint of the partial blind-spot image to the same viewpoint as that of the object vehicle camera. The resultant viewpoint-converted partial blind-spot image data are then combined with the forward-view image data to obtain a synthesized image.

However it would be equally possible to configure the information dispatch apparatus 20 to convert both the partial blind-spot image data and also the forward-view image data into data expressing an image having the viewpoint of the driver of the object vehicle, and to combine the resultant two sets of viewpoint-converted image data to obtain the synthesized image data. This viewpoint conversion of the forward-view image from the object vehicle camera could be done based upon the relative information SI that is transmitted from the object vehicle, expressing the orientation direction of the vehicle camera relative to the travel direction, and the camera height relative to the (predetermined average) height of the eyes of the driver.

It can thereby be ensured that a synthesized image is generated which accurately reflects the forward view of the object vehicle driver. Hence, a natural-appearing synthesized image can be displayed to the driver, even if the viewpoint of the vehicle camera differs significantly from that of the vehicle driver.

It should be noted that with such an embodiment, instead of transmitting the relative information SI, the vehicle-mounted apparatus 10 could be configured to generate position and direction information (based on the position information SN1, the direction information SN2 and the relative information SI), for use in converting the forward-view image to the viewpoint of the object vehicle driver, and to insert this position and direction information into the vehicle information S which is transmitted to the information dispatch apparatus 20.

Alternative Embodiment 2

Figure 5:
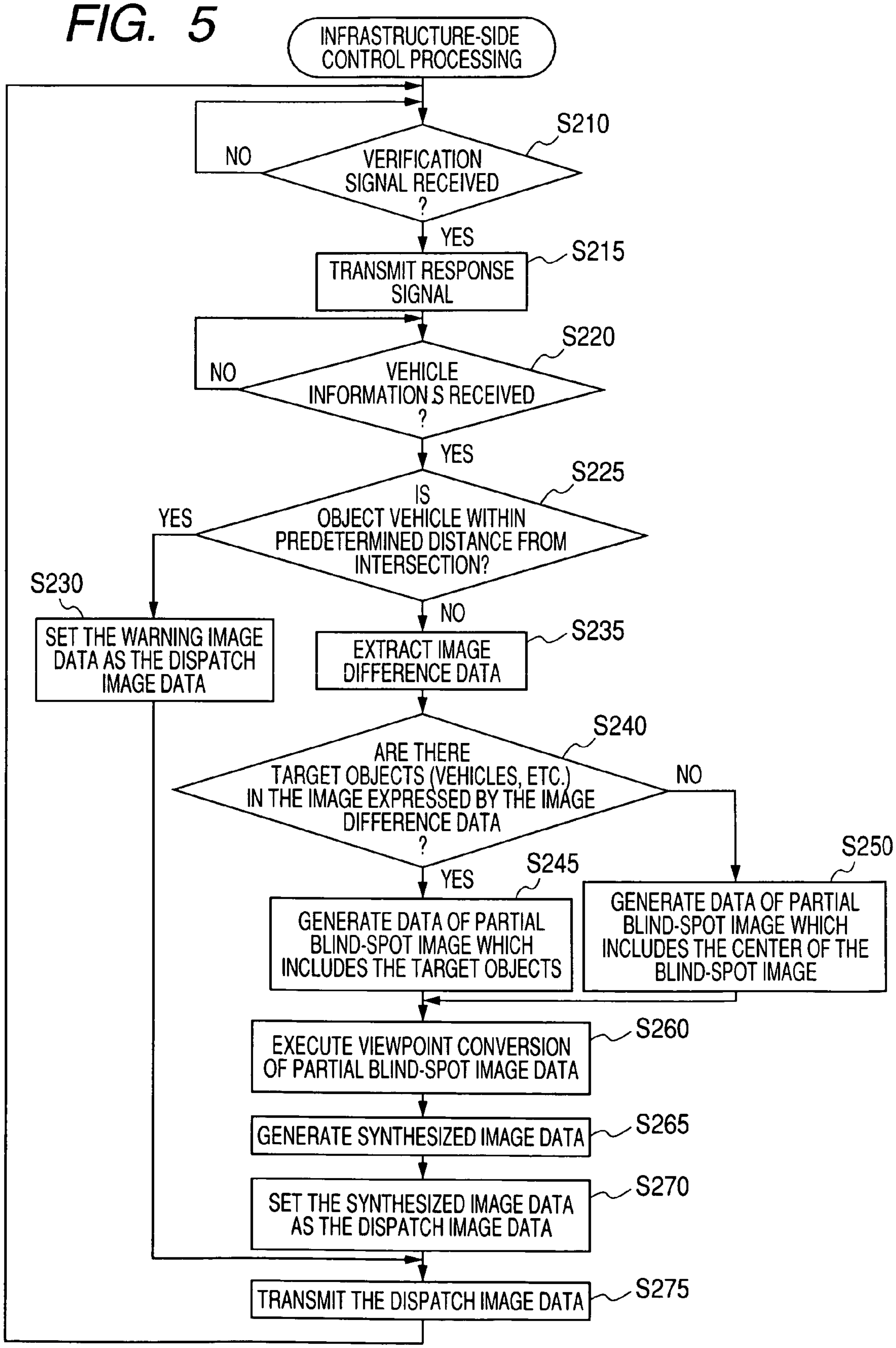
FIG. 5 is a flow diagram showing details of infrastructure-side control processing that is executed by a control section of the information dispatch apparatus.

Instead of using an extracted section of a blind-spot image to generate a partial blind-spot image as described for the first embodiment above, it would be equally possible to perform viewpoint conversion of the difference image (expressed by the image difference data extracted in step S235 of FIG. 5) and to combine the resultant viewpoint-converted image difference data with the forward-view image data to obtain a synthesized image. In that case, the synthesized image would show only those target objects (vehicles, people) that are currently within the blind spot, combined with the forward-view image. Other (background) components of the blind-spot image would not appear in the synthesized image.

In that case, when performing synthesis of the image data, image enhancement processing (e.g., contrast enhancement, color enhancement, etc.) could be applied to the image difference data, to render the target bodies (vehicles, people) in the blind spot more conspicuous in the displayed synthesized image.

Alternative Embodiment 3

Instead of using partial blind-spot image data as with the above embodiment, it would be possible to perform viewpoint conversion of the data of an entire blind-spot image, and combine the resultant viewpoint-converted blind spot image data with the forward-view image data to obtain the synthesized image.

Alternative Embodiment 4

It would be equally possible to form a blind-spot image by applying image enhancement processing such as edge-enhancement, etc., to the contents of the image expressed by the image difference data (i.e., vehicles, people, etc.) and combining the resultant image with a background image of the blind spot, with the contents of that background image having been de-emphasized (rendered less distinct). The combined image would then be subjected to viewpoint conversion, and the resultant viewpoint-converted image would be combined with the forward-view image data, to obtain data expressing a synthesized image to be transmitted to the object vehicle.

Alternative Embodiment 5

Figure 8:
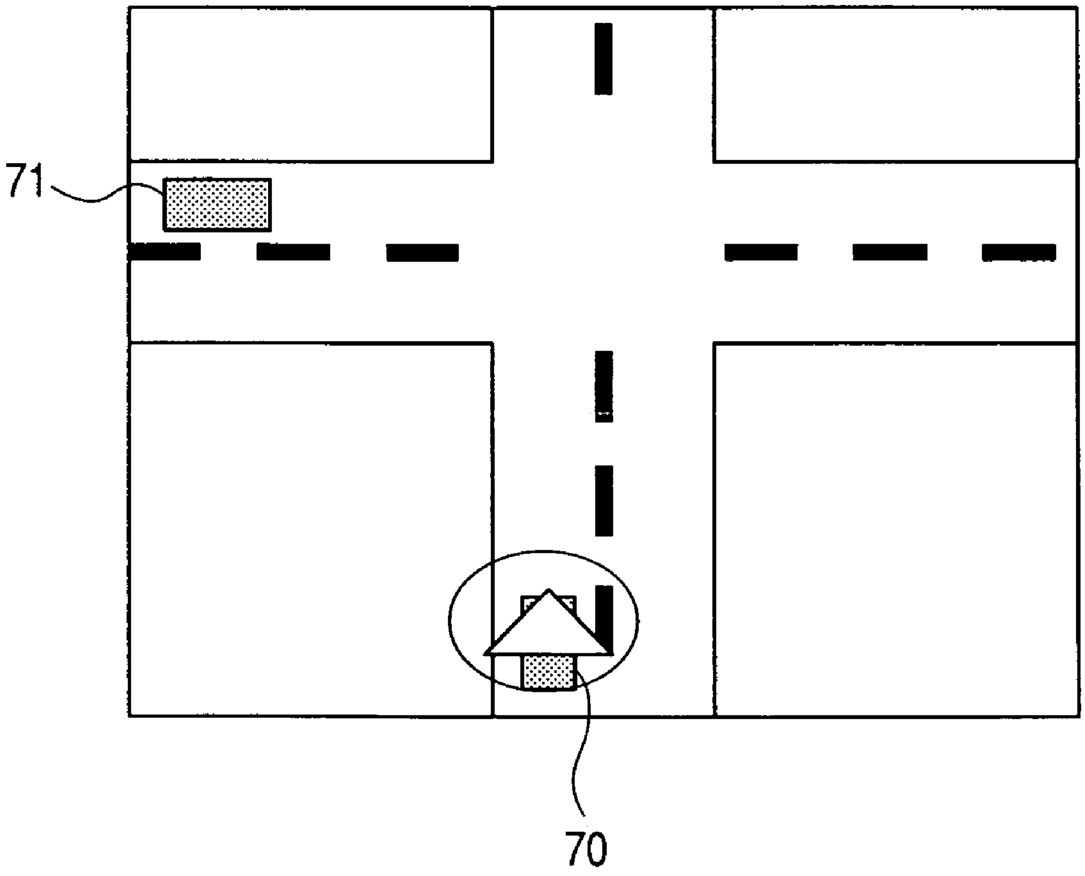
FIG. 8 illustrates an example of a birds-eye view display image that is generated using synthesized image data.

It would be equally possible for the information dispatch apparatus 20 to be configured to convert the blind-spot image data, and also image data expressing an image of a region containing the object vehicle, to a birds-eye viewpoint, i.e., an overhead viewpoint, above the street intersection. Each of the resultant sets of viewpoint-converted image data would then be combined to form a synthesized birds-eye view of the street intersection, including the blind spot and the current position of the object vehicle, as illustrated in FIG. 8. The position information SN1 of the vehicle information would be used to indicate the current position of the object vehicle within that birds-eye view image, i.e., by a specific form of marker as illustrated in the synthesized image example of FIG. 8.

The processing required for converting the images obtained by the infrastructure cameras 21 and the images obtained by the vehicle camera 11 to generate image data expressing a birds-eye view is well known in this field of technology, so that detailed description is omitted.

With such an alternative embodiment, the information dispatch apparatus 20 can be configured to detect any target objects (vehicles, people) within the blind spot (e.g., by deriving a difference image which contains only these target objects, as described hereinabove). A birds-eye view synthesized image could then be generated in which these target objects are indicated by respective markers, as illustrated in FIG. 8, instead of being represented as expressed by the blind-spot image data.

In that case, the driver of the object vehicle would be able to readily grasp the position relationships (distance and direction) between the object vehicle and other vehicles and people, etc., which are currently within the blind spot, by observing the displayed synthesized image.

Alternative Embodiment 6

It would be equally possible to configure the system such that the vehicle-side control processing is executed in parallel with the usual form of vehicle navigation processing, performed by a vehicle navigation system that is installed in the object vehicle. In that case, the vehicle-mounted apparatus can be configured such that when the information dispatch apparatus 20 is to receive dispatch image data that are transmitted from the information dispatch apparatus 20, the image displayed by the control section 16 is changed from a navigation image to a synthesized image showing, for example, a birds-eye view of the street intersection and the vehicle position, as described above for the alternative embodiment 5.

Alternative Embodiment 7

Figure 9:
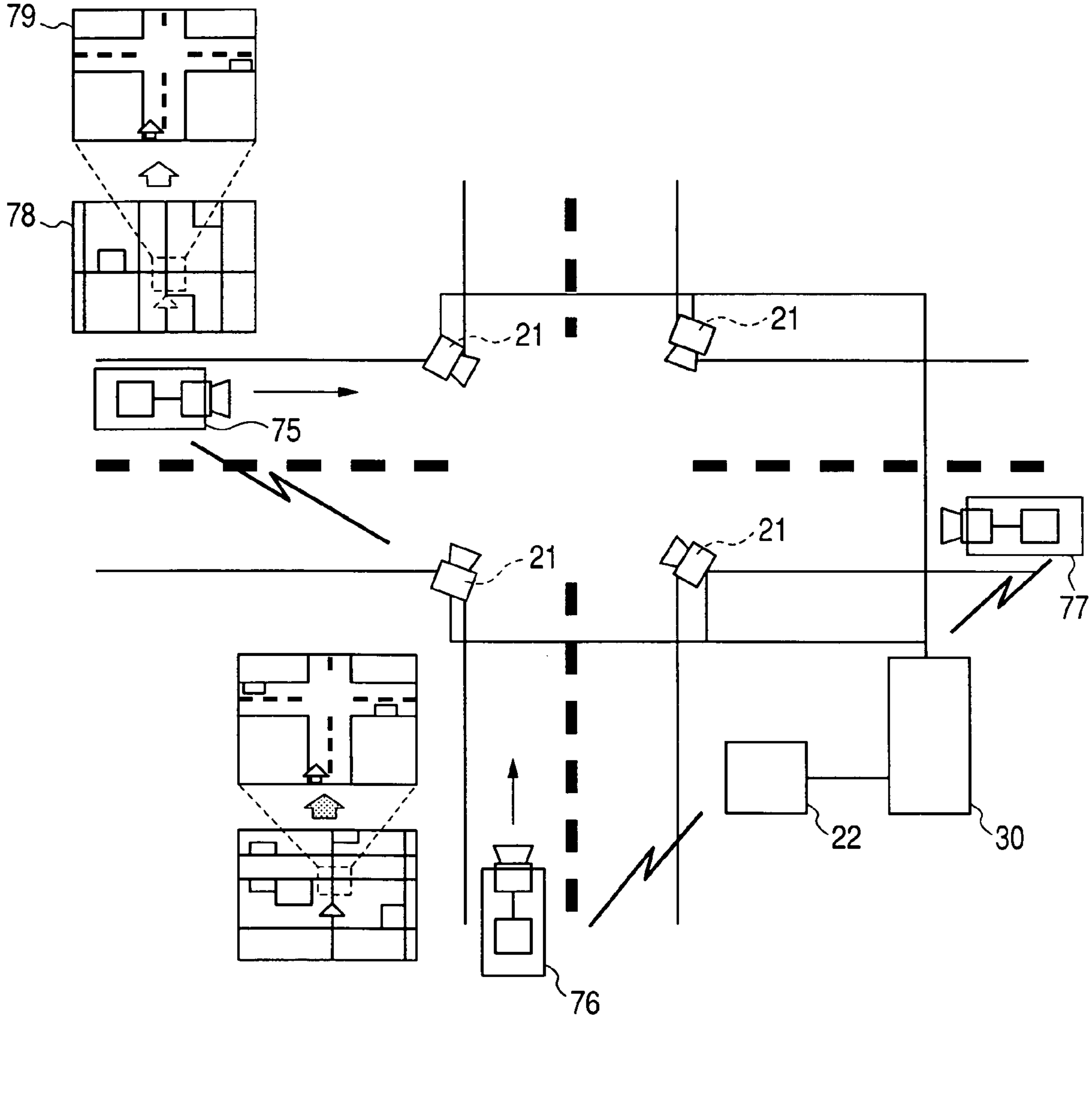
FIG. 9 is a diagram for describing an alternative form of the embodiment, in which a plurality of infrastructure-side cameras capture images of respective blind spots in a street intersection.

It would be equally possible for the information dispatch apparatus 20 to be configured to continuously receive image data of a plurality of blind spots from a plurality of camera groups which each function as described for the infrastructure cameras 21 of the first embodiment, and which are located at various different positions in or near the street intersection. Such a system is illustrated in the example of FIG. 9, and could operate essentially as described for the first embodiment above. In that case, the information dispatch apparatus 20 could transmit synthesized images to each of one or more vehicles that are approaching the street intersection along respectively different streets, such as the vehicles 75, 76 and 77 shown in FIG. 9.

As is also illustrated in FIG. 9, the information dispatch apparatus 20 of such a system can be configured to generate each of the synthesized images as a birds-eye view image, as described above for the alternative embodiment 6. When the same display apparatus is used in common for a vehicle navigation apparatus and as the display section 15 of an object vehicle, then for example as the vehicle 75 approaches the street intersection, the vehicle-mounted apparatus can be configured to enable the driver to switch between viewing an image generated by the vehicle navigation system, as indicated by numeral 78, to viewing a synthesized image that is transmitted from the information dispatch apparatus 20, as indicated by numeral 79.

Alternative Embodiment 8

With the first embodiment described above, a vehicle transmits a forward-view image to the information dispatch apparatus 20 of a street intersection only when the vehicle is approaching that street intersection. However it would be equally possible for a vehicle (equipped with a camera and vehicle-mounted apparatus as described for the first embodiment) to transmit a blind-spot image to the information dispatch apparatus 20 (i.e., an image of a region which is a blind spot for a vehicle approaching the street intersection from a different direction), as it approaches that blind spot. That is to say, the information dispatch apparatus 20 would be capable of utilizing a forward-view image transmitted from one vehicle (e.g., which has already entered the street intersection) as a blind-spot image with respect to another vehicle (e.g., which is currently approaching the street intersection from a different direction).

In that case such blind-spot images, transmitted from vehicles as they proceed through the street intersection along different directions, could be used for example to supplement the blind-spot images that are captured by the infrastructure cameras 21 with the first embodiment.

Alternative Embodiment 9

It would be possible to configure the system to include one or more sensors that are capable of detecting the presence of a vehicle, with each sensor being connected to a corresponding camera, and located close to the street intersection. Each camera would be positioned and oriented to capture an image that is close to the viewpoint of a driver of a vehicle that is approaching the street intersection, with the camera being triggered by a signal from the corresponding sensor when a vehicle moves past the sensor, and would transmit the image data of the resultant forward-view image to the information dispatch apparatus 20 by a wireless link or via a cable connection.

In that case, it becomes unnecessary to install cameras on all of the vehicles which utilize the system, and in addition it becomes unnecessary for a vehicle to periodically transmit verification signals to determine if it is within communication range of the information dispatch apparatus 20, so that the processing load on the vehicle-mounted apparatus would be reduced.

Alternative Embodiment 10

It would be equally possible to configure the system such that the information dispatch apparatus 20 transmits audio data in accordance with the current position of the object vehicle, together with transmitting the dispatch image data. Specifically, audio data could be transmitted from the information dispatch apparatus 20 for notifying the object vehicle driver of the distance between the current position of the object vehicle (obtained from the position information SN1 transmitted from the object vehicle) and the street intersection. In addition, audio data could be similarly transmitted, indicating the time at which data of the blind spot image and forward-view image constituting the current (i.e., most recently transmitted) synthesized image were captured. This time information can be obtained by the information dispatch apparatus 20 based on the amount of time that is required for the infrastructure-side processing to generate a synthesized image. The vehicle-mounted apparatus of an object vehicle which receives such audio data would be configured to output an audible notification from the audio output section 17, based on the audio data.

What is claimed is:

1. A vehicle-use visual field assistance system comprising:

an information dispatch apparatus comprising a blind spot image acquisition unit comprising a ground-based camera positioned and oriented for capturing a blind-spot image showing a current condition of a region that is a blind spot with respect to a forward field of view of a driver of an object vehicle approaching the vicinity of a street intersection, means for receiving vehicle information transmitted from said object vehicle, said vehicle information comprising at least information expressing a forward-view image corresponding to said forward field of view of said driver and information expressing a current position of said object vehicle in relation to said ground-based camera, means for executing viewpoint conversion of said forward-view image and of said blind-spot image to a converted forward-view image and to a converted blind-spot image respectively, said converted forward-view image and said converted blind-spot image having a common viewpoint, and to combine said converted forward-view image and said converted blind-spot image into a synthesized image, and means for transmitting said synthesized image;

a vehicle-mounted apparatus installed in said object vehicle, comprising means for receiving said synthesized image transmitted from said information dispatch apparatus, means for transmitting, said vehicle information to said information dispatch apparatus, and means for displaying said received synthesized image.

2. A vehicle-use visual field assistance system as claimed in claim 1, wherein a viewpoint of said forward-view image constitutes said common viewpoint.

3. A vehicle-use visual field assistance system as claimed in claim 2, wherein said means for executing is configured to generate said synthesized image in a manner for rendering at least a part of said converted blind spot image semi-transparent when displayed by said displaying means.

4. A vehicle-use visual field assistance system as claimed in claim 2, comprising means for deriving a partial blind-spot image from said blind-spot image, where said partial blind-spot image contains objects of a category which includes vehicles and persons, wherein said means for executing combines said partial blind-spot image with said forward-view image to obtain said synthesized image.

5. A vehicle-use visual field assistance system as claimed in claim 4, wherein said information dispatch apparatus comprises a memory having data stored therein beforehand expressing a background image of said blind spot, and wherein:

said deriving means is configured to derive said partial blind spot image as a difference image, expressing differences between said background image and said blind-spot image; and said means for executing is configured to apply said viewpoint conversion to said difference image, and to combine a resultant viewpoint-converted difference image with said forward-view image to obtain said synthesized image.

6. A vehicle-use visual field assistance system as claimed in claim 4, wherein said information dispatch apparatus comprises a memory having data stored therein beforehand expressing a background image of said blind spot, and wherein:

said deriving means is configured to derive a difference image, expressing differences between said background image and said blind-spot image, select a fixed-size section of said blind-spot image such that said section contains any target bodies which appear in said difference image and which are absent from said difference image, and generate said partial blind-spot image as an image that includes said selected section;

said executing means is configured to apply said viewpoint conversion to said partial blind-spot image, and to combine a resultant viewpoint-converted partial blind-spot image with said forward-view image to obtain said synthesized image.

7. A vehicle-use visual field assistance system as claimed in claim 1, wherein:

said vehicle information includes information specifying a current position of said object vehicle;

said common viewpoint is a birds-eye viewpoint; and said executing means is configured to generate said synthesized image as an overhead view which includes said blind spot and includes a region containing said current position of the object vehicle.

8. A vehicle-use visual field assistance system as claimed in claim 7, wherein said synthesized image includes a marker indicating said current position of the object vehicle.

9. A vehicle-use visual field assistance system comprising:

an information dispatch apparatus comprising means for acquiring a blind-spot image showing a current condition of a region that is a blind spot with respect to a forward field of view of a driver of an object vehicle approaching the vicinity of a street intersection, means for receiving vehicle information, said vehicle information including a forward-view image corresponding to said forward field of view of said driver, means for executing viewpoint conversion of said forward-view image and of said blind-spot image to a converted forward-view image and to a converted blind-spot image respectively, said converted forward-view image and said converted blind-spot image having a common viewpoint, and to combine said converted forward-view image and said converted blind-spot image into a synthesized image, means for transmitting said synthesized image;

a vehicle-mounted apparatus installed in said object vehicle, comprising means for receiving said synthesized image transmitted from said information dispatch apparatus, means for transmitting vehicle information relating to said object vehicle, and means for displaying said received synthesized image; and means for inhibiting display of said synthesized image by said displaying means of the vehicle-mounted apparatus when a location of said object vehicle is within a predetermined distance from said street intersection, as indicated by contents of said vehicle information.

10. A vehicle-use visual field assistance system as claimed in claim 9, wherein said inhibiting means comprises means configured for judging whether said object vehicle is within said predetermined distance from the street intersection, based upon said contents of said vehicle information received from said object vehicle, and to inhibit generation of said synthesized image by said image generating means when said object vehicle is judged to be within said predetermined distance.

11. A vehicle-use visual field assistance system as claimed in claim 10, wherein:

said transmitting means of the information dispatch apparatus is configured to transmit a warning image to said object vehicle in place of said synthesized image, for prompting said driver to proceed with caution while directly observing said forward field of view, when said inhibiting means inhibits generation of said synthesized image; and said displaying means of said vehicle-mounted apparatus is configured to display said warning image, when said warning image is received by said receiving means of the vehicle-mounted apparatus.

12. A vehicle-use visual field assistance system as claimed in claim 1, wherein said vehicle-mounted apparatus comprises:

a camera installed on said object vehicle, for capturing said forward-view image;

means for acquiring said forward-view image from the camera; and means for transmitting said acquired forward-view image as part of said vehicle information.

13. A vehicle-use visual field assistance system as claimed in claim 12, wherein said vehicle information transmitted by the means for transmitting said acquired forward-view image includes captured-image information for use in performing said viewpoint conversion of said blind-spot image and of said forward-view image.

14. A vehicle-use visual field assistance system as claimed in claim 13, wherein said captured-image information includes internal parameters of said camera of the object vehicle.

15. A vehicle-use visual field assistance system as claimed in claim 14, wherein said internal parameters comprise at least a focal length of a lens of said object vehicle camera and effective spatial dimensions of a picture element of said forward-view image.

16. A vehicle-use visual field assistance system as claimed in claim 14, wherein said captured-image information includes external parameters of said camera of the object vehicle.

17. A vehicle-use visual field assistance system as claimed in claim 16, wherein said external parameters of the camera of the object vehicle comprise a height of said camera and an orientation direction of said camera.

18. A vehicle-use visual field assistance system as claimed in claim 16, wherein said external parameters of the camera of the object vehicle are expressed as relative parameters, said relative parameters representing a difference between a height of said camera of the object vehicle and a predetermined average height of the eyes of a vehicle driver, and a difference between a direction in which said camera is oriented with respect to said object vehicle and a direction of travel of said object vehicle.

19. A vehicle-use visual field assistance system as claimed in claim 12, wherein:

said information dispatch apparatus comprises a dispatch-side radio transmitting and receiving apparatus, and means for transmitting a predetermined response signal via said dispatch-side radio transmitting and receiving apparatus when a predetermined verification signal is received via said dispatch-side radio transmitting and receiving apparatus;

said vehicle-mounted apparatus comprises a vehicle-side radio transmitting and receiving apparatus; and said means for transmitting said acquired forward-view image is configured to transmit said vehicle information via said vehicle-side radio transmitting and receiving apparatus when said response signal is received via said vehicle-side radio transmitting and receiving apparatus.

20. A vehicle-use visual field assistance system comprising:

an information dispatch apparatus comprising means for acquiring a blind-spot image showing a current condition of a region that is a blind spot with respect to a forward field of view of a driver of an object vehicle approaching the vicinity of a street intersection, means for receiving vehicle information, said vehicle information including a forward-view image corresponding to said forward field of view of said driver, means for executing viewpoint conversion of said forward-view image and of said blind-spot image to a converted forward-view image and to a converted blind-spot image respectively, said converted forward-view image and said converted blind-spot image having a common viewpoint, and to combine said converted forward-view image and said converted blind-spot image into a synthesized image, means for transmitting said synthesized image;

a vehicle-mounted apparatus installed in said object vehicle, comprising means for receiving said synthesized image transmitted from said information dispatch apparatus, means for transmitting vehicle information relating to said object vehicle, and an infrastructure-side apparatus installed adjacent to a street of said street intersection, said infrastructure-side apparatus comprising:

a sensor positioned and configured to detect when said object vehicle attains a predetermined position, and to generate a sensor signal when said attainment is detected;

a camera responsive to said sensor signal for capturing said forward-view image; and transmitter means configured to transmit said captured forward-view image to said information dispatch apparatus.

21. A vehicle-use visual field assistance system comprising:

an information dispatch apparatus comprising a first camera, installed at a location in or adjacent to a street intersection, said camera being positioned and oriented to capture a blind-spot image showing a current condition of a region that is a blind spot with respect to the forward field of view of a driver of an object vehicle approaching the vicinity of said street intersection, circuitry configured to generate first characteristic information, said first characteristic information being specific to said first camera and comprising internal parameters of said first camera, a location of said first camera, and a height and an orientation direction of said first camera;

a radio receiver apparatus for receiving vehicle information relating to said object vehicle, said vehicle information including a forward-view image and second characteristic information, means for converting said blind-spot image to a converted blind-spot image which has a viewpoint of said forward-view image, said conversion being executed based upon said first characteristic information and said second characteristic information, and to combine said forward-view image and at least a selected part of said converted blind-spot image into a synthesized image, and a radio transmitter for transmitting said synthesized image; and a vehicle-mounted apparatus installed in said object vehicle, comprising a second camera, mounted on said vehicle, for capturing said forward-view image, means for detecting a current location of said object vehicle, circuitry configured to generate second characteristic information, said second characteristic information being specific to said second camera and comprising internal parameters of said second camera, said current location, and a height and a current orientation direction of said second camera, a radio transmitter for transmitting said forward-view image in conjunction with said second characteristic information, as said vehicle information, a radio receiver for receiving said synthesized image transmitted from said information dispatch apparatus, and a display unit for displaying said received synthesized image.

22. A vehicle-use visual field assistance system as claimed in claim 21, wherein said vehicle-mounted apparatus comprises:

means for detecting a direction of motion of said object vehicle; and a memory having relative information stored therein, indicative of a relationship between said orientation direction of said second camera and said direction of motion of the object vehicle;

and wherein said current orientation direction of said second camera is calculated based upon said relative information and said detected direction of motion.

* * * * *